US008321072B2

United States Patent
Coulmeau et al.

(10) Patent No.: US 8,321,072 B2
(45) Date of Patent: Nov. 27, 2012

(54) METHOD FOR DETERMINING THE QUANTITY OF FUEL TAKEN ON BOARD AN AIRCRAFT MAKING IT POSSIBLE TO MAINTAIN A TIME REQUIREMENT OF THE RTA TYPE

(75) Inventors: François Coulmeau, Seilh (FR); Emmanuel Dewas, Toulouse (FR); Philippe Chaix, Tournefeuille (FR)

(73) Assignee: Thales, Neuilly-sur-Seine (FR)

( * ) Notice: Subject to any disclaimer, the term of this patent is extended or adjusted under 35 U.S.C. 154(b) by 242 days.

(21) Appl. No.: 12/763,880

(22) Filed: Apr. 20, 2010

(65) Prior Publication Data

US 2010/0274418 A1 Oct. 28, 2010

(30) Foreign Application Priority Data

Apr. 21, 2009 (FR) ...................................... 09 01920

(51) Int. Cl.
*G05D 3/00* (2006.01)
(52) U.S. Cl. .......................................................... 701/3
(58) Field of Classification Search ........................ None
See application file for complete search history.

(56) References Cited

U.S. PATENT DOCUMENTS

| | | |
|---|---|---|
| 5,121,325 A | 6/1992 | DeJonge |
| 5,457,634 A | 10/1995 | Chakravarty |
| 7,272,491 B1 * | 9/2007 | Berard ........................... 701/467 |
| 2005/0113984 A1 * | 5/2005 | Rupe ................................. 701/3 |
| 2005/0116109 A1 | 6/2005 | Berard |
| 2005/0267673 A1 * | 12/2005 | Blagg et al. ................... 701/123 |
| 2008/0300738 A1 | 12/2008 | Coulmeau et al. |
| 2009/0164056 A1 * | 6/2009 | Cornet et al. ..................... 701/3 |

FOREIGN PATENT DOCUMENTS

EP 1 595 789 A1 11/2005

* cited by examiner

*Primary Examiner* — Thomas Tarcza
*Assistant Examiner* — Nagi Murshed
(74) *Attorney, Agent, or Firm* — Baker & Hostetler LLP

(57) ABSTRACT

A method for determining the quantity of fuel in an aircraft and an optimization criterion such as a cost index, notably used in an FMS, making it possible to maintain a time requirement of the RTA type, comprising a first step of computing the optimization criterion $CI_i$ as a function of the aircraft weight $GW_{i-1}$ via a method of the RTA type and a second step of computing the weight of the aircraft $GW_i$ as a function of the optimization criterion $C_{i-1}$ computed in the first computation step and the aircraft weight $GW_{i-1}$, executed by successive iterations, until the estimated flight time resulting from the computed parameters after the second computation step makes it possible to observe the time requirement to within a determined criterion $\delta t$, a last step determining the pair of values of aircraft weight $GW_i$ and of performance criterion $CI_{i-1}$ allowing an optimal fuel payload and the maintenance of the RTA.

9 Claims, 6 Drawing Sheets

METHOD FOR DETERMINING THE QUANTITY OF FUEL TAKEN ON BOARD AN AIRCRAFT MAKING IT POSSIBLE TO MAINTAIN A TIME REQUIREMENT OF THE RTA TYPE

CROSS-REFERENCE TO RELATED APPLICATIONS

This application claims priority to foreign France patent application No. 0901920, filed on Apr. 21, 2009, the disclosure of which is hereby incorporated by reference in its entirety.

BACKGROUND OF THE INVENTION

1. Field of the Invention

The present invention relates to a method for determining the quantity of fuel taken on board an aircraft making it possible to maintain a time requirement of the RTA (the acronym for "Required Time of Arrival") type. It applies notably to the aviation field and more particularly to flight management devices installed in aircraft.

2. Discussion of the Background

In the general context of air traffic, it is a fact that the density of traffic increases year by year. At the same time, the environmental impact of air traffic must be reduced. Finally, the accident rate must be maintained at the current level or even reduced. Observance of these principles and requirements notably imposes on air traffic control bodies an increasing grip on the flight profiles of the aircraft operating in air space. At the same time, the operators of these aircraft must use devices aimed at satisfying the requests from the air traffic control bodies while minimizing their impact, notably on piloting procedures, the initial flight plan and compliance with the predictions in terms of aircraft operating costs.

Typically, the air traffic control bodies may require aircraft to pass by given points in air space at given times, or RTAs. RTAs allow the air traffic control bodies to ensure a smoothed flow and to manage a stable number of airplanes corresponding to the capacities of the tools at their disposition and to the maximum acceptable load on an air traffic controller. These time constraints are also used to manage the closures and openings of air spaces or of airport installations.

In parallel, it is of great value to the airlines to adjust as well as possible their payloads, and functions for computing the payload have been developed making it possible notably to optimally adjust the fuel payload. Such functions optimize the compromise between the performance of the aircraft, its consumption, and flight safety while holding to the reserves imposed by air traffic regulation.

On board the aircraft, the time requirements of the RTA type, and the payload computations, are usually handled by a flight management system, usually designated by the acronym FMS. An FMS consists of various functional components which allow the aircraft crew to program a flight using a navigation database. The system in this case computes the profiles of lateral and vertical trajectories allowing the aircraft the various Waypoints, often designated by the abbreviation WPT, of the flight plan. These computations are based on the characteristics of the aircraft and on data supplied by the crew, the various onboard sensors and the means of communication with the outside environment. The positioning and guidance functions then collaborate to help the aircraft stay on its trajectory.

There are notably known methods of the prior art, used in FMSs, that make it possible to determine the speed profiles best suited to maintaining a time requirement of the RTA type. Such methods operate on a set of input data comprising a flight plan, a cruising level, the required time constraints and the weight of the aircraft or "airplane weight". These methods generate as an output a flight criterion or "optimization criterion" making it possible to determine the speed profile of the aircraft. The flight criterion may be a criterion associated with the operating cost of the aircraft, such as the cost index, often designated CI. The CI represents the ratio between the cost of a flight in terms of all the parameters not associated with fuel, including the cost of the flight personnel for example, and its cost in terms of fuel. Other types of flight criteria may be employed, for example criteria associated with flight performance.

There are also known methods of the prior art, often called "Fuel Planning", that make it possible to make predictions as to the fuel consumed, and therefore to determine the optimal fuel payload. Such methods operate on a set of input data comprising a flight plan, a zero-fuel weight of the aircraft, a cruising level, and an optimization criterion making it possible to determine the speed profile, such as the aforementioned CI. These methods generate as an output a necessary fuel payload and therefore an airplane weight.

This reveals a relationship of partial interdependence between the Fuel Planning methods and the RTA maintenance methods. Therefore, the known methods of Fuel Planning are not compatible with an RTA maintenance method. Consequently, with the current FMSs, when a requirement of the RTA type is defined in a flight plan, a message of the type "Fuel Planning Ignores RTA" is displayed to the pilots of the aircraft.

SUMMARY OF THE INVENTION

The present invention alleviates the aforementioned drawbacks by proposing an improvement of an existing Fuel Planning method, allowing it to operate in the presence of a time requirement of the RTA type. The new method for determining fuel quantity to be taken on board according to the invention therefore seeks to adjust the fuel payload with the aim of complying with the regulatory reserves on the one hand and of satisfying the RTA requirement on the other hand.

Accordingly, the subject of the invention is a method for determining the quantity of fuel to be taken on board an aircraft and an optimization criterion capable of determining a speed profile, the method making it possible to maintain a time requirement to within a determined criterion, said method comprising at least the following steps:

- a preliminary step, computing, via a method for determining the payload quantity of fuel, a gross weight of the aircraft in a first iteration, and the flight time of the aircraft resulting therefrom, as a function of an initial optimization criterion and a zero-fuel weight,
- a comparison step comparing the absolute value of the difference between the flight time determined in the previous iteration and the flight time required in order to observe the time requirement, with said determined criterion, passing to a subsequent iteration and initiating a first computation step when said difference is greater than the criterion, or initiating a last step otherwise,
- the first computation step, determining the optimization criterion in the current iteration as a function of the weight of the aircraft in the previous iteration via a method for determining an optimization criterion for maintaining a time requirement, then passing to the next iteration, a second computation step following the first computation step, determining, via a method for determining the payload quantity of fuel, the weight of the aircraft in the current iteration as a function of the optimization criterion in the previous iteration and of the weight of the aircraft in the previous iteration and the flight time resulting therefrom, the second computation step being followed by the comparison step, the last step determining the weight of fuel to be taken on board equal to the difference between the weight of the aircraft in the current iteration and the zero-fuel weight of the aircraft, and determining the optimization criterion equal to the optimization criterion in the previous iteration.

In one embodiment of the invention, the method for determining the quantity of fuel to be taken on board an aircraft can also be characterized in that the first computation step determines the optimization criterion in the current iteration as a function of the weight of the aircraft in the previous iteration corrected by a stored predetermined scale factor.

A further subject of the invention is a method for determining the quantity of fuel to be taken on board an aircraft and an optimization criterion capable of determining a speed profile, the method making it possible to maintain a time requirement, said method comprising at least the following steps:

a preliminary step, computing, via a method for determining the payload quantity of fuel, a gross weight of the aircraft in a first iteration, and the flight time of the aircraft resulting therefrom, as a function of an initial optimization criterion and of a zero-fuel weight, a first step determining a first flight time for a predetermined maximum value of the optimization criterion and the gross weight of the aircraft determined in the second preliminary step, a second step determining, via a method for determining the payload quantity of fuel, a weight of the aircraft corresponding to the maximum optimization criterion, a third step determining a third optimization criterion making it possible to obtain a flight time equal to said first flight time, as a function of the weight of the aircraft determined in the second step via a method for determining an optimization criterion for maintaining a time requirement, a fourth step determining a fourth optimization criterion making it possible to satisfy the time requirement, as a function of the gross weight of the aircraft determined in the second preliminary step, via a method for determining an optimization criterion for maintaining a time requirement, a step of determining the optimum weight of the aircraft and the optimum optimization criterion according to the following relations:

$$GW_6 = GW_1 - (GW_1 - GW_{MAX})*(CI_{RTA} - CI_0)/(CI_{MAX} - CI_0);$$    i $$CI_6 = (CI_4 - CI_0)*(GW_6 - GW_1)/(GW_{MAX} - GW_1) + CI_0;$$    II.

$GW_6$ being the optimum weight of the aircraft, $CI_6$ the optimum optimization criterion, $GW_1$ the gross weight of the aircraft determined in the second preliminary step, $GW_{MAX}$ the weight of the aircraft corresponding to the maximum optimization criterion determined in the second step, $CI_{RTA}$ the fourth optimization criterion, $CI_0$ the initial optimization criterion, and $CI_{MAX}$ the maximum optimization criterion.

In one embodiment of the invention, a method for determining the quantity of fuel to be taken on board an aircraft as described above can be characterized in that the optimization criterion is a cost index.

In one embodiment of the invention, a method for determining the quantity of fuel to be taken on board an aircraft as described above may be characterized in that the optimization criterion is a performance index.

A further subject of the present invention is a flight management device of an aircraft of the FMS type, said device using a method for determining the quantity of fuel to be taken on board as described above.

BRIEF DESCRIPTION OF THE DRAWINGS

Other features and advantages of the invention will become apparent on reading the description, given as an example, made with respect to the drawings appended hereto which represent.

DESCRIPTION OF THE PREFERRED EMBODIMENTS

Figure 1:
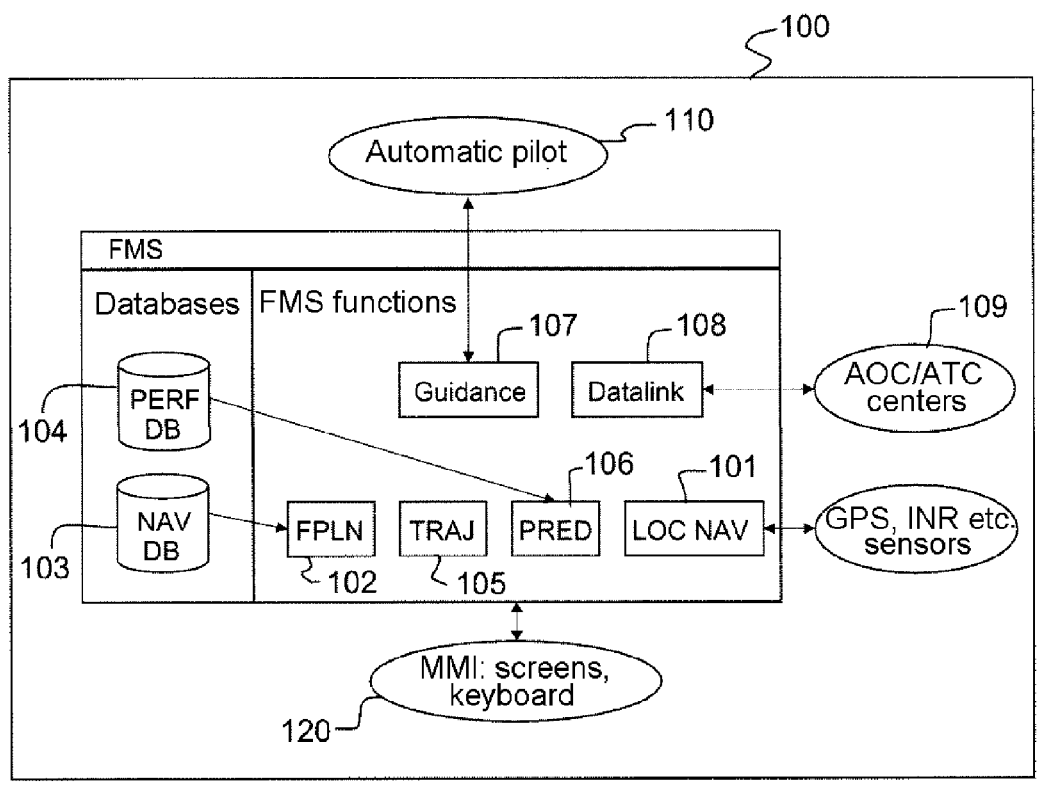
FIG. 1, through a summary diagram, the structure of a flight management system of the FMS type, known in the prior art.

FIG. 1 shows a summary diagram illustrating the structure of a flight management system of the FMS type, known in the prior art.

A system of the FMS type 100 has a man-machine interface 120 comprising for example a keyboard and a display screen, or simply a touch-sensitive display screen, and at least the following functions described in the aforementioned ARINC 702 standard:

Navigation (LOCNAV) 101, in order to optimally locate the aircraft as a function of the geolocation means 130 such as global positioning by satellite or GPS, GALILEO, VHF radionavigation beacons, or inertial units. This module communicates with the aforementioned geolocation devices;

Flight plan (FPLN) 102, for entering the geographic elements forming the skeleton of the route to be followed, such as the points imposed by the departure and arrival procedures, the waypoints, and the air corridors or airways;

Navigation database (NAVDB) 103, for constructing geographic routes and procedures based on data included in the databases relating to the points, beacons, interception or altitude legs etc.;

Performance database (PRFDB) 104, containing the aerodynamic and driving parameters of the craft;

Lateral trajectory (TRAJ) 105, for constructing a continuous trajectory based on the points of the flight plan, in accordance with the performance of the aircraft and the confinement requirements (RNP);

Predictions (PRED) 106, for constructing an optimized vertical profile on the lateral and vertical trajectory. The functions forming the subject of the present invention affect this part of the computer;

Guidance (GUID) 107, for guiding the aircraft in the lateral and vertical planes on its three-dimensional trajectory, while optimizing its speed. In an aircraft fitted with an automatic pilot device 110, the latter can interchange information with the guidance module 107;

Digital datalink (DATALINK) 108 for communicating with control centers and other aircraft 109.

The flight plan is entered by the pilot, or by datalink, based on data contained in the navigation database. A flight plan consists typically of a successive of segments usually called "legs" which are formed of a termination and a geometry, for example a geometry of the turn type, or else of the straight-line type in great-circle route or in rhumb-line. The various types of legs are defined in international standard ARINC 424.

The pilot then enters the parameters of the aircraft: weight, flight plan, range of cruising levels, and one or a plurality of optimization criteria, such as the CI. These inputs allow the TRAJ module 105 and PRED module 106 to compute respectively the lateral trajectory and the vertical profile, that is to say the flight profile in terms of altitude and speed, which for example minimizes the optimization criterion.

The method of the present invention can be incorporated into the TRAJ module 105 and PRED module 106 of an FMS.

Figure 2A:
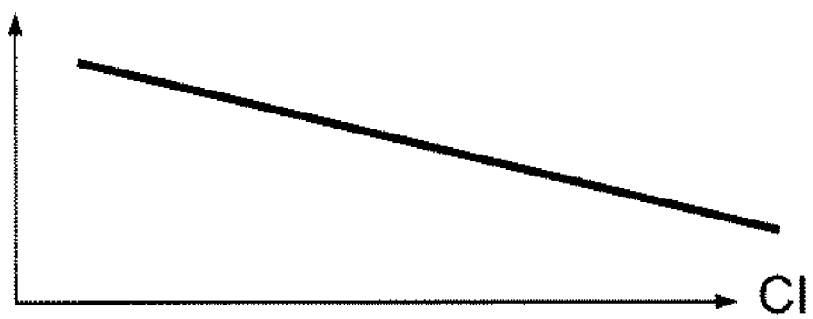
FIGS. 2a and 2b, examples of curves representing respectively the flight time and the fuel consumption, as a function of the Cost Index.
Figure 2B:
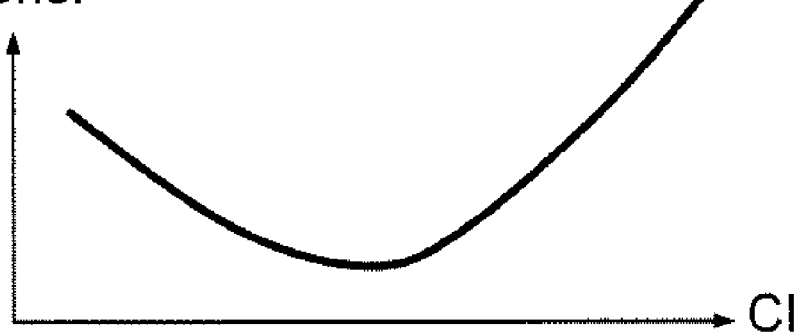

FIGS. 2a and 2b show examples of curves representing respectively the flight time and the fuel consumption as a function of the Cost Index.

With reference to FIG. 2a, a first curve 21 represents the fuel consumption of an aircraft as a function of the CI.

The general appearance of the first curve 21 is a decreasing linear curve.

With reference to FIG. 2b, with respect to the second curve 22, typically, the fuel consumption as a function of the CI initially decreases to a certain value of the CI for which the curve then increases.

Remember that the CI is an optimization criterion between the cost of time, usually designated by the acronym CT, and the cost of fuel, usually designated by the acronym CF. The CI is defined by the ratio CT/CF and takes values typically between 0 and 999 or 0 and 99 depending on the manufacturer, in kg/minute for example, if the CT is expressed in $/minute and the CF in $/kg.

Typically, a very low cost index corresponds to a configuration according to which the cost of time CT is considered negligible relative to the cost of fuel CF: planning the flight then consists in finding flight speeds that are low enough for fuel consumption to be as low as possible, and the flight duration as long as possible. For an aircraft operator, this corresponds to configurations of the long-haul type.

Conversely, a very high cost index corresponds to a configuration according to which the cost of fuel CF is considered negligible relative to the cost of time CT: planning the flight then consists in finding a flight duration that is as short as possible, even though the flight must be made at the price of high fuel consumption. For an aircraft operator, this corresponds to flights of the shuttle type, in which what is sought is preferably a maximum number of turnarounds, or else ensuring an earlier arrival time in the event of delay or of precise landing slots.

Figure 3:
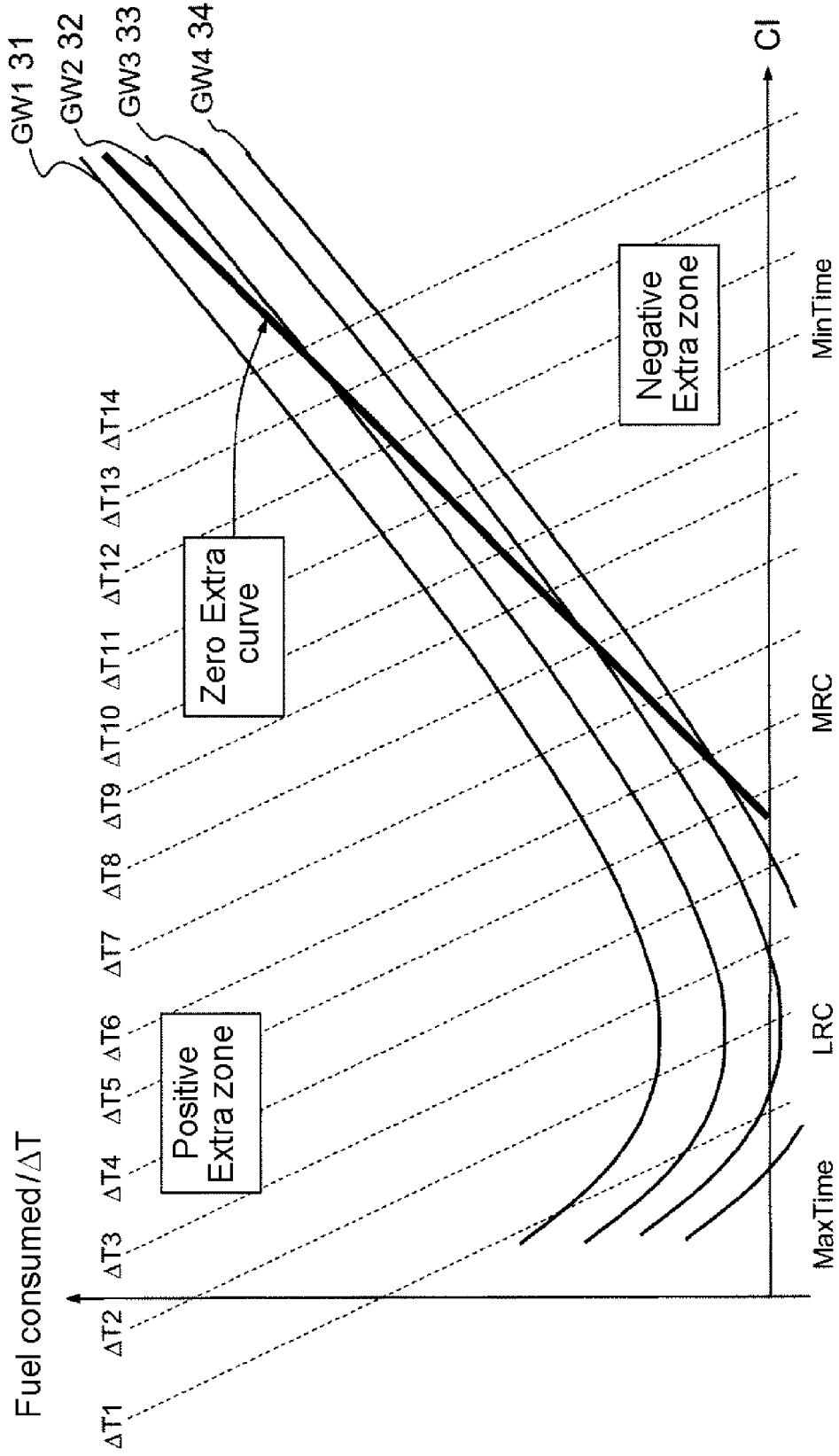
FIG. 3, examples of curves, represented on one and the same coordinate system, illustrating the fuel consumption and flight time for various fuel payload weights.

FIG. 3 exhibits examples of curves, shown on one and the same coordinate system, illustrating the fuel consumption and flight time for various fuel payload weights.

In FIG. 3, four curves GW1, GW2, GW3, GW4 represent the fuel consumption for four different possible weights of an aircraft.

The curves are situated in one and the same coordinate system, the axes of which are positioned in an arbitrary manner.

The weight $GW_i$ is equal to the initial zero-fuel weight $ZFW_i$ of the aircraft and of the fuel on board $FOB_i$.

Several flight time curves $\Delta Ti$ are shown in the figure; these curves correspond to various possible weights of the aircraft.

An object of the invention is to find the initial weight $GW_i$ that intersects the curve $\Delta T_j$, $GW_i$ and $\Delta T_j$ being such that:
  $\Delta T_j$ is equal to the required flight time, that is the difference between the RTA and the take-off time, and
  the difference between the quantity of fuel on board $FOB_i$ and the fuel consumed at the destination (including the reserves) is zero.

This second condition is illustrated in FIG. 3 by a curve example "Zero Extra". In a "Positive Extra" zone situated above this curve, irrespective of the weight/flight time configurations considered, a quantity of fuel remains at the destination. Conversely, in a "Negative Extra" zone situated beneath this curve, it may be considered that the quantity of payload fuel is not sufficient to reach the destination.

It should be noted that the more the CI tends toward a fast flight, the shorter the observed flight time; the tendency is then toward a minimum time criterion shown in FIG. 3 by the reference "Min Time".

Likewise, a low, or even negative, CI corresponds to a longer flight time; the tendency is then toward a maximum time criterion shown in FIG. 3 by the reference "Max Time".

Between the two can be seen two particular values known in the literature by the following designations:
  MRC for "Max Range Cruise" corresponding typically to CI=0;
  LRC for "Long Range Cruise" corresponding to a CI that is slightly higher than for the MRC, consuming 1% more fuel but providing a very significant time saving.

Moreover, at a given CI value, the flight time increases when the initial weight of the aircraft increases.

Figure 4:
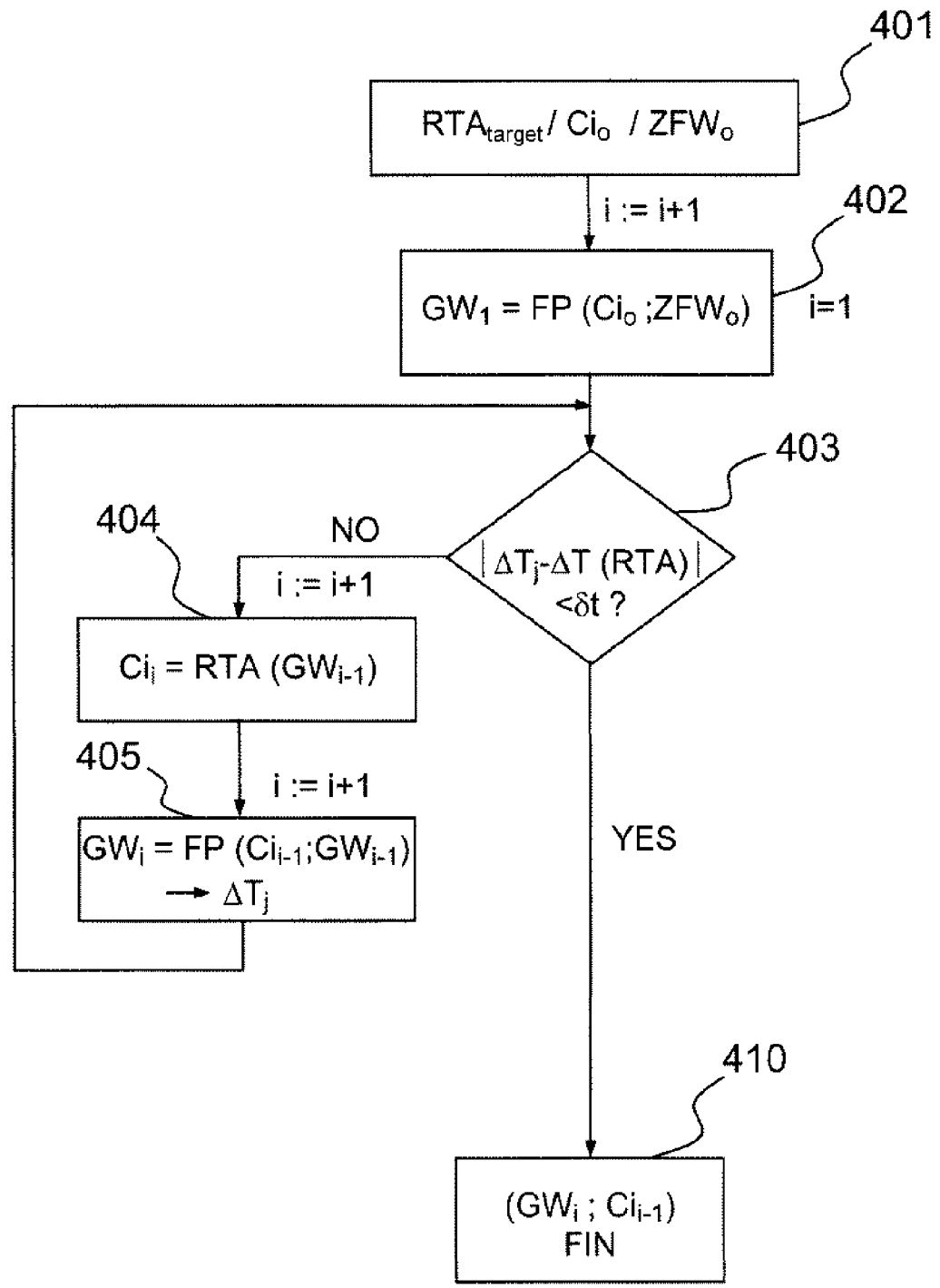
FIG. 4, a logic diagram illustrating the principle of the method for determining the quantity of fuel taken on board, according to one embodiment of the invention.

FIG. 4 shows a logic diagram illustrating the principle of the method for determining the quantity of fuel taken on board, according to one embodiment of the present invention.

A first preliminary step 401 involves entering initial flight data. A second preliminary step 402 determines a first weight $GW_1$ of the aircraft.

A first comparison step 403 compares the moment of arrival predicted in the RTA, or, in other words, the flight time required to the flight time required in order to comply with the moment of arrival imposed by the RTA, denoted $\Delta T(RTA)$. If the predicted moment of arrival is close enough to the RTA according to a predetermined criterion $\delta t$, the fuel payload quantity and the cost index making it possible to carry out the flight achieving arrival at the required time, and taking on board an optimal quantity of fuel, are determined and the method ends with the last step 410. Otherwise, the index i is incremented and a first computation step 404 determines a cost index $CI_i$ allowing arrival at the required RTA. The index i is then incremented and a second computation step 405 determines the optimal fuel payload quantity and therefore an aircarft weight $GW_i$, associated with a new flight time $\Delta Ti$.

After the second computation step 405, the method again carries out the comparison step 403, and so on, until the comparison made in the step 403 culminates in the last step 410, that is to say in the determination of an optimum fuel payload quantity in order to carry out a flight in which the arrival takes place at the RTA.

In the first preliminary step 401, the initial flight data are for example entered by the pilot via the man-machine interface 120 of the FMS and comprise at least one cost index $CI_0$ recommended by the aircraft operator along with a zero-fuel weight $ZFW_0$ and the target RTA.

The computation produced in the second preliminary step 402 can for example be made by a Fuel Planning FP method proposed by most FMS manufacturers and known in the prior art. Such a method operates for example by successive iterations. The FP method determines a fuel payload quantity—and therefore an aircraft weight $GW_1$—and a flight time $\Delta T_1$, on the basis of at least the cost index $CI_0$ and the zero-fuel weight $ZFW_0$. It is possible to formulate the second preliminary step 402 according to the relation: $(GW_1; \Delta T_1)=FP(CI_0; ZFW_0)$.

The same Fuel Planning FP method is employed in the second computation step 405. Therefore, in the same way, it is possible to formulate the second computation step 405 by the relation: $(GW_i; \Delta T_i)=FP(CI_{i-1}; GW_{i-1})$.

Equally, the computation produced in the first computation step 404 can for example be carried out by an RTA method known in the prior art such as the method described in the American patent published under reference U.S. Pat. No. 5,121,325, that can also operate by successive iterations. The RTA method determines a cost index CI (or another flight criterion making it possible to generate a speed profile), on the basis of an aircraft weight $GW_i$. It is therefore possible to formulate the first computation step 404 according to the relation: $CI_i=RTA(GW_{i-1})$.

The criterion $\delta t$ employed for the comparison made in the comparison step 403 can for example be a criterion preestablished by the aircraft operator for a given flight, or be entered by the pilot.

The pair of values, aircraft weight and cost index, determined in the last step 410 can be written $(GW_i; CI_{i-1})$, or the pair of values, fuel quantity to be taken on board and cost index, can be written $(FOB_i=GW_i-ZFW_0; CI_{i-1})$.

Figure 5:
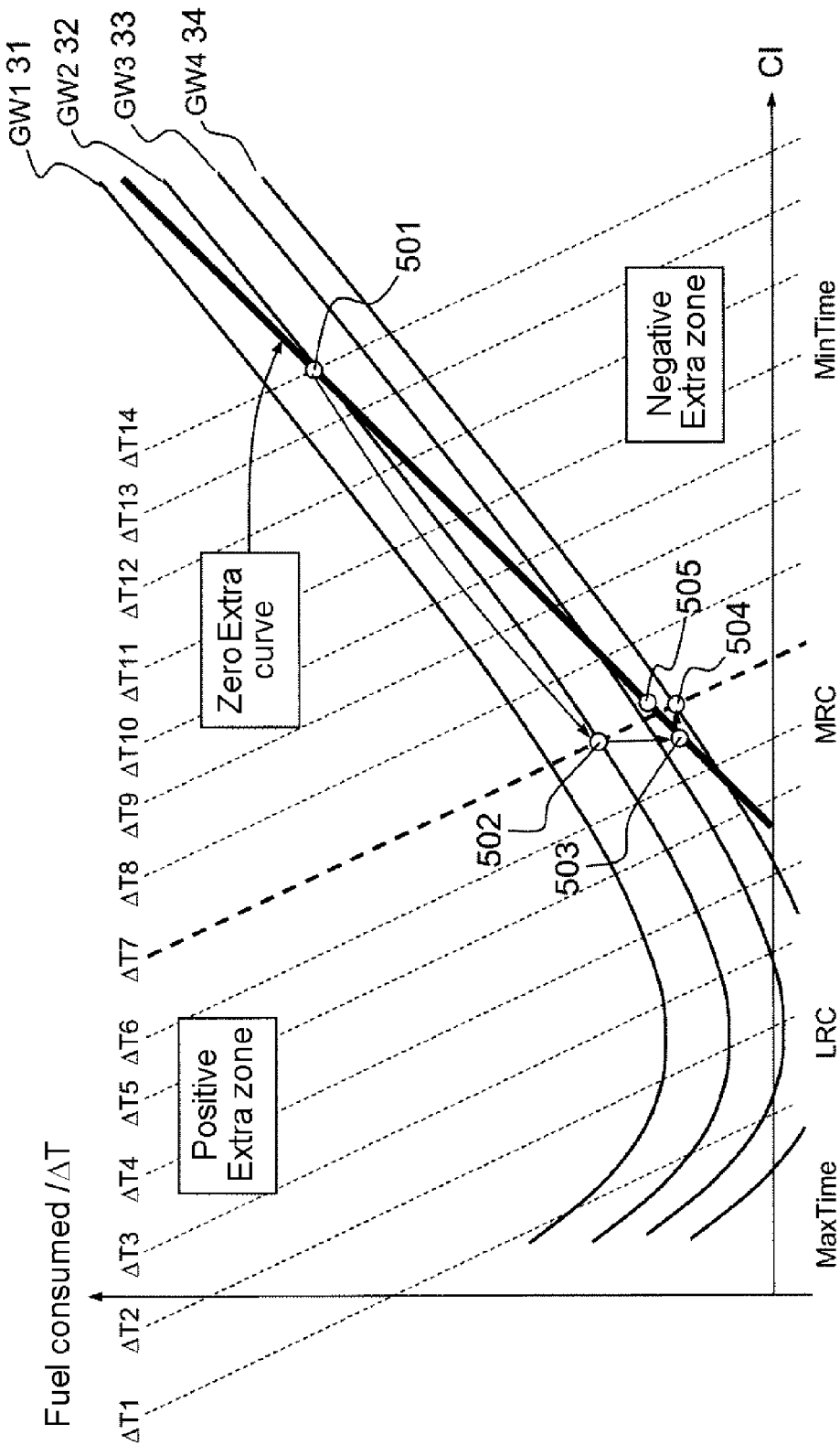
FIG. 5, on the example of the curves of FIG. 3, an illustration of successive iterations in order to determine the quantity of payload fuel according to one embodiment of the invention.

FIG. 5 shows, on the example of the curves of FIG. 3, an illustration of successive iterations in order to determine the fuel payload quantity according to one embodiment of the invention. FIG. 5 allows a better understanding of the invention on the basis of an example.

In the example of FIG. 5, the flight time required to comply with the RTA requirement is the flight time $\Delta T7$.

Various points 501 to 505 illustrate in the coordinate system of the curves 5 successive iterations of the function.

Beginning with an initial state, notably with a cost index $CI_0$ and a zero-fuel weight $ZFW_0$ for example entered by the pilot, the method, in the second step 402 cited in reference to FIG. 4, determines, without consideration of the required flight time, the aircraft weight $GW_1$ making it possible to obtain a Zero Extra of fuel: this state is illustrated in FIG. 5 by the first point 501. In the example of the figure, the flight time in this configuration is then equal to $\Delta T14$, faster than the required flight time $\Delta T7$. In addition, according to the assessment made in the comparison step 403, the difference between $\Delta T14$ and $\Delta T7$ is greater, in absolute value, than the criterion $\delta t$, not shown in the figure.

The method, in the first computation step 404 cited with reference to FIG. 4, then computes the cost index $CI_2$, making it possible, in this example, to slow down so that the flight time is brought to $\Delta T7$. The status after this step is illustrated in FIG. 5 by the second point 502. At this stage, the fuel payload, and therefore the weight $GW_1$, is too great: this fact is illustrated in FIG. 5 by a position of the second point 502 in the Positive Extra zone, namely above the Zero Extra curve.

Therefore the method, in the second computation step 405 cited with reference to FIG. 4, then computes the weight $GW_3$ making it possible to optimize the fuel payload quantity, on the basis of the cost index $CI_2$ computed in the previous iteration. The status after this step is illustrated by the third point 503. The flight time is then between $\Delta T16$ and $\Delta T7$. Nevertheless, according to the assessment made in the comparison step 403, the difference between this new flight time and $\Delta T7$ is still greater, in absolute value, than the criterion $\delta t$.

The method, in the first computation step 404, then computes the cost index $CI_4$, making it possible, in this example, to accelerate so that the flight time is brought to $\Delta T7$. After this step, the status is illustrated by the fourth point 504. At this stage, the fuel payload, and therefore the weight $GW_3$, is too low: this fact is illustrated in FIG. 5 by a position of the second point 502 in the Negative Extra zone, namely below the Zero Extra curve.

The method, in the second computation step 405, then computes the weight $GW_5$ making it possible to optimize the fuel payload quantity, on the basis of the cost index $CI_4$, computed in the previous step. The status after this step is illustrated by the fifth point 505. Then, according to the assessment made in the comparison step 403, the flight time is then sufficiently close to the required time $\Delta T7$, with respect to the criterion $\delta t$. Therefore, the pair of values $(GW_5; CI_4)$ is finally determined by the function in the last step 410, and the FMS or any other device using the method can quit execution of the latter.

Advantageously, it is possible, in one embodiment of the invention, to accelerate the convergence of the method by making a double correction of the CI and of the fuel payload quantity. That is to say that it is possible to optimize the method by computing, in the first computation step 404, the $CI_i$ making it possible to maintain a requirement no longer on the basis of the weight $GW_{i-1}$, but of the weight $GW_{i-1}$ corrected by a scale factor dependent on the capacities of the airplane, and for example stored in a table or charts in the FMS or in any other device connected to the FMS.

Advantageously, it is again possible in one embodiment of the invention to optimize the speed of execution of the function on the basis essentially of a hypothesis by which the Zero Extra curve is a straight line. This embodiment is illustrated on the basis of an example by FIG. 6.

Figure 6:
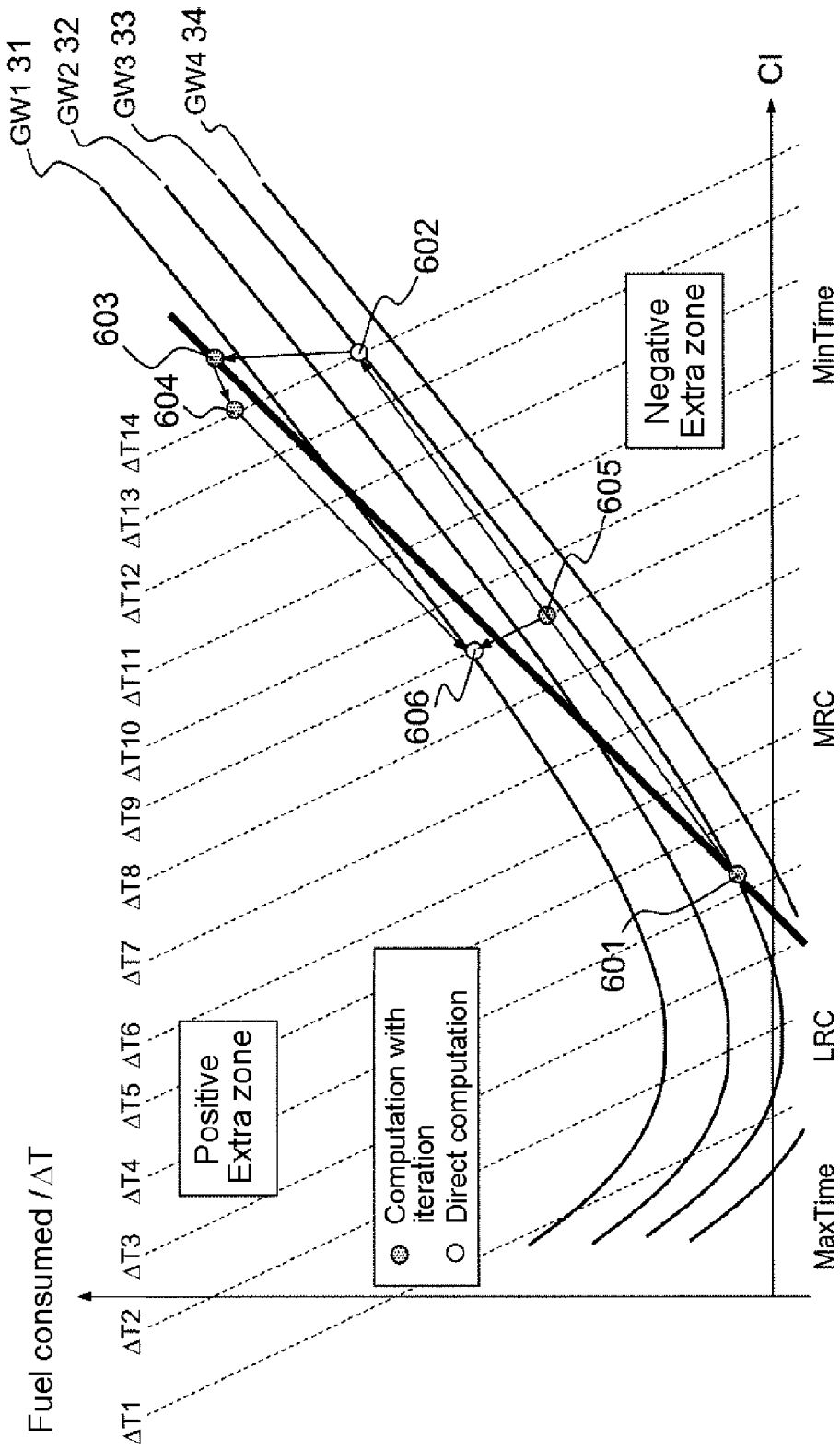
FIG. 6, on the example of the curves of FIG. 3, an illustration of successive iterations for determining the quantity of payload fuel according to another embodiment of the invention.

FIG. 6 shows, on the example of the curves of FIG. 3, an illustration of successive iterations for determining the fuel payload quantity according to another embodiment of the invention.

Points 601 to 606 illustrate the various operating steps of the method.

In the example of FIG. 6, the flight time required to satisfy the RTA requirement is the flight time $\Delta T9$. Beginning with an initial state, notably with a cost index $CI_0$ and a zero-fuel weight $ZFW_0$ for example entered by the pilot, the method, in the second step 402 cited with reference to FIG. 4, determines, without consideration of the required flight time, the weight of the aircraft $GW_1$ making it possible to obtain a Zero Extra of fuel: this state is illustrated in FIG. 6 by the first point 601. In the example of the figure, the flight time in this configuration is then equal to $\Delta T4$, slower than the required flight time $\Delta T9$. Moreover, according to the assessment made in the comparison step 403, the difference between $\Delta T4$ and $\Delta T9$ is greater, in absolute value, than the criterion $\delta t$, not shown in the figure.

The method then directly determines a flight time, on the basis of the weight $GW_1$ determined in the previous step, and of the maximum possible value of the cost index $CI_{MAX}$. In the example of the figure, the outcome of this step is illustrated by the second point 602, and the flight time is then $\Delta T14$.

In the example, the second point 602 is situated below the Zero Extra curve, which illustrates the fact that the weight $GW_1$, and hence the fuel payload, is too low. The method then computes, via a known Fuel Planning method, the weight $GW_{MAX}$ making it possible to cancel out the extra fuel on the basis of the cost index $CI_{MAX}$. The outcome of this step is illustrated in the figure by the third point 603.

On the basis of the weight $GW_{MAX}$, the method then computes the cost index $CI_4$ making possible a flight time equal to $\Delta T14$. The outcome of this step is illustrated in the figure by the fourth point 604.

Moreover, the method computes, via a known RTA method, the cost index $CI_{RTA}$ making it possible to maintain the time requirement $\Delta T9$ on the basis of the weight $GW_1$ determined previously. The outcome of this step is illustrated in the figure by the fifth point 605.

According to the reasonable hypothesis that the Zero Extra curve is a straight line, it is then possible, on the basis of the first point 601, of the second point 602, of the fourth point 604 and of the fifth point 605 computed above and of Thalès' theorem, to determine the sixth point 606 corresponding to an aircraft weight $GW_6$ and to a cost index $CI_6$ in the following manner:

$$GW_6 = GW_1 - (GW_1 - GW_{MAX}) * (CI_{RTA} - CI_0)/(CI_{MAX} - CI_0),$$

$$CI_6 = (CI_4 - CI_0) * (GW_6 - GW_1)/(GW_{MAX} - GW_1) + CI_0.$$

It should be noted that the embodiments of the invention described above remain applicable for alternative types of optimization criteria, such as criteria based directly on the speed, or else various flight cost criteria. Naturally, the embodiments described above also remain applicable if the time requirement is applied to a point of the flight plan that is intermediate between the position of the aircraft and the point of arrival.

Advantageously, the method for determining the fuel payload quantity according to one of the embodiments described above can be employed to determine an in-flight refueling and/or the in-flight jettisoning of fuel, or "defueling", in missions in which such operations are carried out.

With respect to refueling, it is for example possible to use as the initial weight of the aircraft the weight predicted at the entry point of the refueling procedure, and as the RTA the arrival time predicted at the point of entry of the refueling procedure. It is then possible to run the steps of the method, as shown in one of the embodiments described above, for the purpose of determining the minimum refueling quantity ensuring a sufficient level of reserve on arrival while maintaining the time requirement.

With respect to defueling, it is possible to use as the initial weight the weight predicted at the point of entry of the defueling procedure, and as the RTA the arrival time predicted at the point of entry of the defueling procedure. It is then possible to run the steps of the procedure, as shown in one of the embodiments described above, for the purpose of determining the maximum quantity of fuel to jettison that ensures a sufficient level of reserve on arrival while maintaining the time requirement.

Advantageously, the method for determining the fuel payload quantity according to one of the embodiments described above can be employed in the context of missions in which a plurality of refueling and defueling operations are necessary.

In such an embodiment, the method can, for example, be applied flight portion by flight portion. The first flight portion can be defined as the flight portion comprised between take-off and the first defueling or refueling operation, the second flight portion can be defined as the flight portion comprised between the first defueling or refueling operation and the second defueling or refueling operation, and so on up to the last flight portion comprised between the last refueling or defueling operation and landing. Several configurations then need to be distinguished:

if the outcome of the first flight portion is a refueling operation, then:
  the method determines the fuel payload quantity and the optimization criterion making it possible to obtain the desired reserves of fuel at the time of the first refueling operation, otherwise
if the outcome of the first flight portion is a defueling operation, then:
  if the outcome of the second flight portion is a refueling operation:
    if the quantity of defueling is known, the method determines the fuel payload quantity and the optimization criterion making it possible to obtain the desired fuel reserves at the time of refueling, otherwise
    the method determines the fuel payload quantity and the optimization criterion making it possible to obtain the desired reserves at the time of refueling, by being based on a default defueling quantity (for example 0 or another predetermined value); otherwise
  if the outcome of the second flight portion is a defueling operation:
    the same principle as above is applied, according to the outcome of the third flight portion, and so on up to the last flight portion.

Advantageously, the method also makes it possible to compute minimum fuel payload quantities making it possible to maintain time requirements of the inequality type, usually called "AT OR AFTER", "AT OR BEFORE", or else "WINDOW".

A requirement of the "AT OR AFTER" type is a requirement imposing passing through a given point at or after a given moment. Such a requirement leads to a maximum speed profile that must not be exceeded. The method as shown according to one of the embodiments described above makes it possible to determine the minimum fuel payload ensuring the reserve on arrival.

A requirement of the "WINDOW" type is a requirement imposing passing through a given point between two given moments. It is possible, for this type of requirement, to employ the method described above according to one of the embodiments of the invention by applying two time limits delimiting the requirement in order to obtain the range of fuel payload quantity necessary to ensure arrival between the two required times. It is also possible to use the method in order to determine the fuel payload quantity making it possible to reach the arrival point at the moment, for example, that is equal to the mean between the two time limits of the requirement of the "WINDOW" type.

A requirement of the "AT OR BEFORE" type is a requirement imposing passing through a given point at a given moment or before that moment. Such a requirement leads to a minimum speed profile below which the aircraft must not fly. The method as shown according to one of the embodiments described above makes it possible to determine the maximum fuel payload quantity ensuring the reserve on arrival.

The invention claimed is:

1. A method performed by a computer included in a flight management system for determining the quantity of fuel to be taken on board an aircraft and an optimization criterion capable of determining a speed profile, the method making it possible maintain a time requirement to within a determined criterion, said method comprising at least the following steps:
- a preliminary step, computing, via a method for determining the payload quantity of fuel, a gross weight of the aircraft in a first iteration, and the flight time of the aircraft resulting therefrom, as a function of an initial optimization criterion and a zero-fuel weight,
- a comparison step comparing the absolute value of the difference between the flight time determined in the previous iteration and the flight time required in order to observe the time requirement, with said determined criterion, passing to a subsequent iteration and initiating a first computation step when said difference is greater than the criterion, or initiating a last step otherwise,
- the first computation step, determining the optimization criterion in the current iteration as a function of the weight of the aircraft in the previous iteration via a method for determining an optimization criterion for maintaining a time requirement, then passing to the next iteration,
- a second computation step following the first computation step, determining, via a method for determining the payload quantity of fuel, the weight of the aircraft in the current iteration as a function of the optimization criterion in the previous iteration and of the weight of the aircraft in the previous iteration and the flight time resulting therefrom, the second computation step being followed by the comparison step,
- the last step determining the weight of fuel to be taken on board equal to the difference between the weight of the aircraft in the current iteration and the zero-fuel weight of the aircraft, and determining the optimization criterion equal to the optimization criterion in the previous iteration.

2. The method for determining the quantity of fuel to be taken on board an aircraft as claimed in claim 1, wherein the first computation step determines the optimization criterion in the current iteration as a function of the weight of the aircraft in the previous iteration corrected by a stored predetermined scale factor.

3. A method performed by a computer included in a flight management system for determining the quantity of fuel to be taken on board an aircraft and an optimization criterion capable of determining a speed profile, the method making it possible to maintain a time requirement, said method comprising at least the following steps: a preliminary step computing, via a method for determining the payload quantity of fuel, a gross weight of the aircraft in a first iteration, and the flight time of the aircraft resulting therefrom, as a function of an initial optimization criterion and of a zero-fuel weight, a first step determining a first flight time for a predetermined maximum value of the optimization criterion and the gross weight of the aircraft determined in the second preliminary step, a second step determining, via a method for determining the payload quantity of fuel, a weight of the aircraft corresponding to the maximum optimization criterion, a third step determining a third optimization criterion making it possible to obtain a flight time equal to said first flight time, as a function of the weight of the aircraft determined in the second step via a method for determining an optimization criterion for maintaining a time requirement, a fourth step determining a fourth optimization criterion making it possible to satisfy the time requirement, as a function of the gross weight of the aircraft determined in the second preliminary step, via a method for determining an optimization criterion for maintaining a time requirement, a step of determining the optimum weight of the aircraft and the optimum optimization criterion according to the following relations: PS $GW_6 = GW_1 - (GW_1 - GW_{MAX})*(CI_{RTA} - CI_0)/(CI_{MAX} - CI_0)$; i $CI_6 = (CI_4 - CI_0)*(GW_6 - GW_1)/(GW_{MAX} - GW_1) + CI_0$; ii. $GW_6$ being the optimum weight of the aircraft, $CI_6$ the optimum optimization criterion, $GW_1$ the gross weight of the aircraft determined in the second preliminary step, $GW_{MAX}$ the weight of the aircraft corresponding to the maximum optimization criterion determined in the second step, $CI_{RTA}$ the fourth optimization criterion, $CI_0$ the initial optimization criterion, and $CI_{MAX}$ the maximum optimization criterion.

4. The method for determining the quantity of fuel to be taken on board an aircraft as claimed in claim 1, wherein the optimization criterion is a cost index.

5. The method for determining the quantity of fuel to be taken on board an aircraft as claimed in claim 3, wherein the optimization criterion is a cost index.

6. The method for determining the quantity of fuel to be taken on board an aircraft as claimed in claim 1, wherein the optimization criterion is a performance index.

7. The method for determining the quantity of fuel to be taken on board an aircraft as claimed in claim 3, wherein the optimization criterion is a performance index.

8. A flight management device of an aircraft of the FMS type, wherein said device uses a method for determining the quantity of fuel to be taken on board as claimed in claim 1.

9. A flight management device of an aircraft of the FMS type, wherein said device uses a method for determining the quantity of fuel to be taken on board as claimed in claim 3.

* * * * *